UNITED STATES PATENT OFFICE.

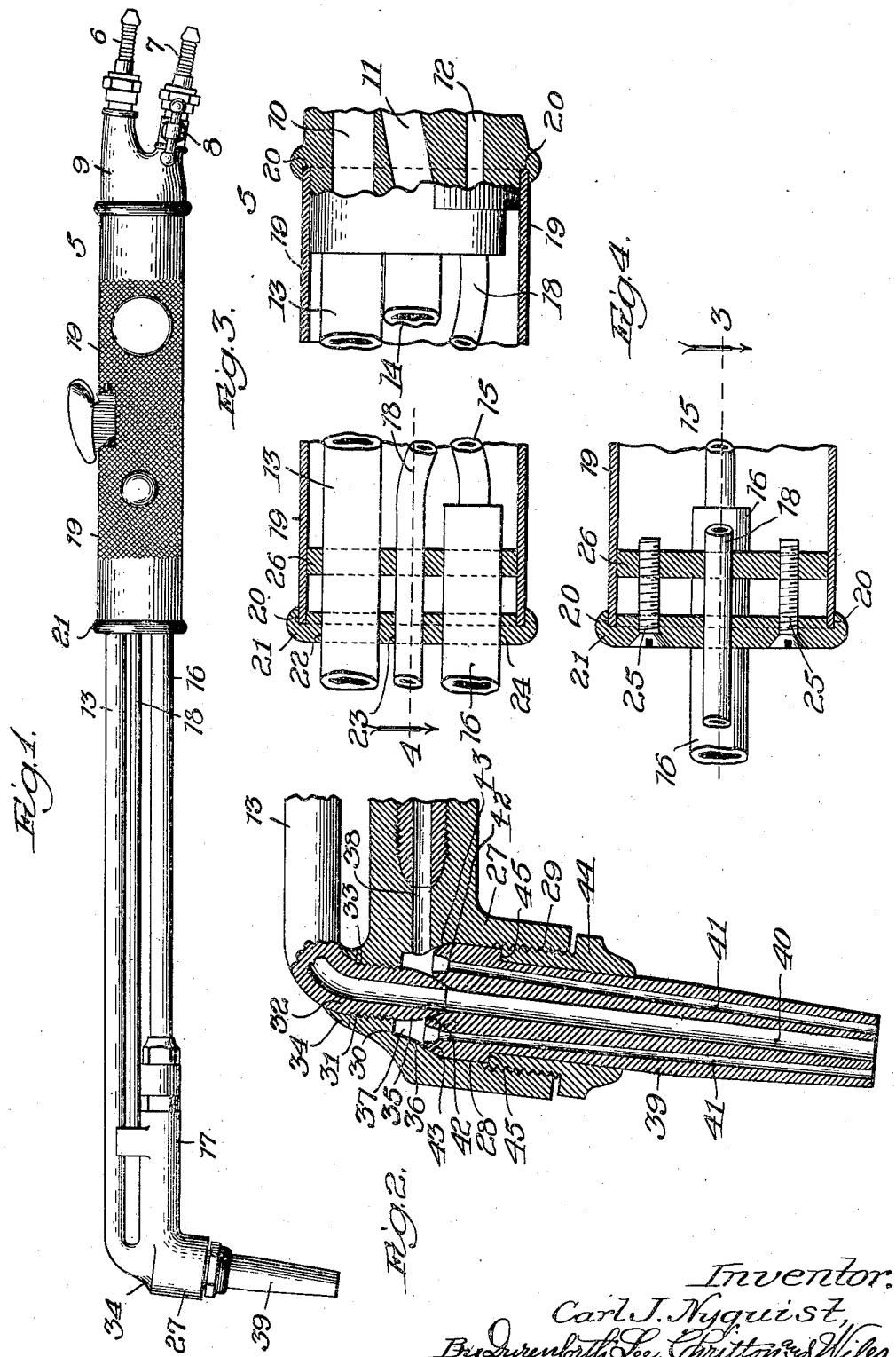

CARL J. NYQUIST, OF CHICAGO, ILLINOIS.

CONDUIT-EQUIPPED STRUCTURE.

1,304,197.  Specification of Letters Patent.  Patented May 20, 1919.

Application filed November 18, 1918. Serial No. 263,002.

*To all whom it may concern:*

Be it known that I, CARL J. NYQUIST, a citizen of the United States, residing at Chicago, in the county of Cook and State of Illinois, have invented a new and useful Improvement in Conduit-Equipped Structures, of which the following is a specification.

My invention has to do, as to one feature thereof, with structures involving a portion having a plurality of conduits through which fluid passes, formed of separate sections with coöperating seating surfaces at which the joints between these sections, are produced; and as to another feature thereof, to the handle portions of torches, in general, employing gas as fuel.

My primary object is to provide the plural-seated structure of such form that very tight joints may be produced between these sections, the parts may be economically constructed, and, in case of undue wear, may be readily repaired. In this connection it may be stated that the more particular use for which I have devised my improvements is in connection with gas-burning torches, more especially of the "cutting" type, wherein the sectional structure referred to above forms a part of the nozzle-head portion of the torch, and a further object in connection with the use of the invention in such a structure, is to maintain the joint between the sections of this part of the structure, in tight condition, regardless of changes in temperature of this part of the torch.

Referring to the accompanying drawing:

Figure 1 shows by a view in side elevation, an oxyacetylene gas torch of the so-called "cutting" type, equipped with my improvements applied to the nozzle-head portion of the torch. Fig. 2 is an enlarged view in longitudinal sectional elevation of the nozzle-head-portion of the device. Fig. 3 is a broken view in sectional elevation of the handle-portion of the torch, the section being taken at the line 3 on Fig. 4, and viewed in the direction of the arrow; and Fig. 4, a section taken at the line 4 on Fig. 3, and viewed in the direction of the arrow.

In the particular construction illustrated, the handle-portion of the device is represented at 5, this portion of the device being provided with two inlets 6 and 7, the inlet 6 for connection with the supply (not shown) of oxygen, and the inlet 7, which is preferably equipped with a valve 8, for connection with a supply (not shown) of acetylene gas. The inlets 6 and 7 are directly connected with a rear-end member 9 containing conduits 10, 11, and 12, the conduits 10 and 11 communicating with the inlet 6 and the conduit 12 communicating with the inlet 7. Extending from the conduit 10 is a pipe 13 which passes through the handle-portion 5. The conduit 11 is connected with a pipe 14 which connects with a reduced pipe section 15 which, in turn, communicates with an enlarged pipe section 16 opening into a mixing chamber 17 of any desirable construction; and connected with the conduit 12 is a pipe 18 which, also, opens into the mixing chamber 17, the purpose of the pipe 13 being to conduct, in the particular torch illustrated, oxygen into the nozzle-head hereinafter described, and the purpose of the pipes 16 and 18 being to convey oxygen and acetylene, respectively, into the mixing chamber 17 for intermixture therein and thence its passage into, and through, the nozzle-head for ignition at the tip of the nozzle. The handle-portion 5 is formed of the hollow cylindrical shell 19 which surrounds the gas conduits, as shown in Figs. 1 and 3, and is interlocked at its opposite ends in annular grooves 20 in the member 9 and in a disk 21 containing apertures 22, 23, and 24, through which the pipes 13, 18, and 16, respectively, extend. The member 9 is rigid with the pipes which pass through the handle-portion 5, and the disk 21 which is adjustable along these pipes in a direction toward and away from the member 9, is held in proper position for securely holding the member 19 (which preferably is formed of two separate halves which join together lengthwise of the handle), by means of screws 25 extending through the disk 21 and screwing into a disk 26 brazed, or otherwise secured, to one or more of the pipes 13, 16, and 18, extending therethrough.

The nozzle-head of the torch illustrated comprises a generally cylindrical extension 27 on the outer end of the mixing chamber 17, the portion 27 containing a socket 28 internally threaded at its outer end, as represented at 29, the end wall 30 of the socket containing the internally threaded aperture 31 in which the deflected end-portion 32 of the pipe 13, is secured at its threaded portion 33, the pipe 13 and portion 27, in practice, being preferably brazed at the joint thus provided, with a fillet member 34 assembled therewith. The extremity of the pipe 13 extends outwardly beyond the end-wall 30 and is preferably of circular contour and curved toward its extremity as represented at 35, this portion of the pipe 13 being centrally disposed within a similarly-shaped annular surface 36 presented by the wall of the socket 28, an annular space 37 being thereby presented between the surfaces 35 and 36 into which space a conduit 38, in communication with the mixing chamber 17, opens, as illustrated in Fig. 2, the surface 36 being transversely curved in a direction opposite to that of the surface 35. The nozzle-head also includes a nozzle-tip 39 shown as formed in one piece and containing a centrally-disposed passage 40 for auxiliary oxygen, and a plurality of passages 41, which may be of any number desired, for conducting the mixed oxygen and acetylene to the discharge-end of the tip, where it is burned to produce the desired flame. The tip 39 is so formed as to present the inner and outer annular curved surfaces 42 and 43, respectively, the annular surface 42 surrounding the passage 40 and the annular surface 43 surrounding the inner ends of the passages 41 and passage 40, these two annular surfaces being so shaped as to make a very tight joint, preferably each by single contact, with the annular surfaces 35 and 36, respectively, which latter serve the function of seats and which, as will be noted from the drawing, are located substantially the same distance from the outer extremity of the nozzle-tip 39. The tip 39 is held in place by a gland 44 surrounding the tip and opposing an annular shouldered portion 45 thereon, this gland screwing into the threaded portion 29 of the socket 28 and operating to force the tip into rigid contact with the seats 35 and 36.

Inasmuch as the seat 35 is of less area than the seat 36, it appears to be desirable that the seat 35 be of harder metal than the seat 36 and, preferably, to this end the pipe 13 is made of nickel, though it may be made of any other suitable material, the idea in this connection is to balance, so to speak, the resistance to wear of the seats 35 and 36 by making them of metals of different hardness, so that they will wear as nearly equal as possible.

It will be noted from the foregoing that while the tip 39 is formed in one piece with a plurality of surfaces coöperating with a plurality of seats in another part of the head, danger of leakage from one conduit to another in the head by non-uniform expansion of the contacting surfaces, is prevented, as these contacting surfaces, namely, the seats 35 and 36, and surfaces 42 and 43, are located substantially the same distance from the outer extremity of the burner-tip and thus are subjected to substantially the same heat, causing them to contract and expand substantially equally. Furthermore, the formation of the surfaces 42 and 43 of the tip, as shown, permits of ready and economical re-shaping of these surfaces, in case of wear.

While I have illustrated and described a particular construction embodying my improvements, I do not wish to be understood as intending to limit my invention thereto, as the same may be variously modified and altered without departing from the spirit of my invention.

What I claim as new and desire to secure by Letters Patent, is:—

1. In a sectional structure containing a plurality of conduits, the combination of one section having a plurality of seats, one of which surrounds the other, said section containing a plurality of conduits, one of which opens through said section within the confines of the inner one of said seats, and the other of which opens through said section between said seats, and a second section held to said first-named section and having surfaces which bear against said seats, with conduits in said second section in communication, respectively, with the said conduits in said first-named section, said seats extending substantially in the same plane transversely of the length of said sectional structure.

2. In a sectional structure containing a plurality of conduits, the combination of one section having a plurality of seats, one of which surrounds the other, said section containing a plurality of conduits, one of which opens through said section within the confines of the inner one of said seats, and the other of which opens through said section between said seats, and a second section held to said first-named section and having surfaces which bear against said seats, with conduits in said second section in communication, respectively, with the said conduits in said first-named section, the inner one of said seats being of harder material than the other seat, and said seats extending substantially in the same plane transversely of the length of said sectional structure.

3. In a sectional structure containing a plurality of conduits, the combination of one section having a plurality of annular seats, curved in cross-section, one of which surrounds the other, said section containing a plurality of conduits, one of which opens through said section within the confines of the inner one of said seats and the other of which opens through said section between said seats, and a second section held to said first-named section and having annular surfaces curved in cross section, which bear against said seats, with conduits in said second section in communication, respectively, with the said conduits in said first-named section, said seats extending substantially in the same plane transversely of the length of said sectional structure.

4. In a sectional structure containing a plurality of conduits, the combination of one section having a plurality of annular seats oppositely curved in cross-section and presenting an annular channel with its walls flaring outwardly toward the open end of said section, one of said seats surrounding the other thereof, said section containing a plurality of conduits, one of which opens through said section within the confines of the inner one of said seats, and the other of which opens through said section between said seats, and a second section held to said first-named section and having annular surfaces which extend into said channel and bear against said seats, with conduits in said second section in communication, respectively, with the said conduits in said first-named section.

5. In a sectional structure containing a plurality of conduits, the combination of one section having a plurality of annular seats oppositely curved in cross-section and presenting an annular channel with its walls flaring outwardly toward the open end of said section, one of said seats surrounding the other thereof, said section containing a plurality of conduits, one of which opens through said section within the confines of the inner one of said seats, and the other of which opens through said section between said seats, and a second section held to said first-named section and having annular surfaces which extend into said channel and bear against said seats, with conduits in said second section in communication, respectively, with the said conduits in said first-named section, said seats extending substantially in the same plane transversely of the length of said sectional structure.

6. In a structure of the character set forth, the combination of a plurality of members arranged in spaced relation, the intermediate member and one of the end-members being rigidly connected together and the other end-member being movable, said end-members having seats in opposed faces, a casing-member located between said end-members and surrounding said intermediate member and seating at its ends against said seats, and means securing said adjustable end-member to said intermediate member to hold said members and casing-member in assembled condition.

CARL J. NYQUIST.